Patented Mar. 6, 1951

2,544,507

UNITED STATES PATENT OFFICE 2,544,507

ALKALINE EARTH SULFIDE PHOSPHORESCENT PIGMENTS

Donald W. Lyon, Wilmington, Del., assignor to E. I. du Pont de Nemours & Company, Wilmington, Del., a corporation of Delaware No Drawing. Application April 29, 1949, Serial No. 90,560

13 Claims. (Cl. 252—301.4)

This invention relates to improved luminescent materials and especially to phosphorescent substances.

The common materials suitable for use as pigmentary substances and having useful phosphorescence are the sulfides or selenides of zinc, cadmium, calcium, and strontium, and mixed zinc-cadmium or calcium-strontium sulfides. The alkaline earth sulfides are usually preferred, because of their longer afterglow. The present invention has as an object the provision of alkaline earth sulfide materials, which have phosphorescence superior to that of pre-existing phosphors. A particular object is to prepare a new phosphor which has a longer useful afterglow than previously available pigments. A further object is to furnish a phosphor which has a higher brightness, at any given time after an initial short period of decay, than that of known luminescent substances. Other objects will become apparent from the ensuing description of my invention.

These objects are attained by my new process which comprises activating an alkaline earth sulfide with two distinct activators, namely bismuth and silver. The dual-activated product of this process is a phosphor whose afterglow is bright and of surprisingly long duration.

In a more specific and preferred embodiment of my invention, I commingle a purified alkaline earth compound which will on reduction yield an alkaline earth sulfide, a compound of bismuth, and a compound of silver. This mixture is calcined at an elevated temperature in a reducing atmosphere, preferably in the presence of a suitable fluxing agent, and a phosphorescent alkaline earth sulfide results. If desired, I may similarly prepare a blend of activated alkaline earth sulfides, such as a mixture of the calcium and strontium compounds.

This treatment with the two activators mentioned is highly specific to alkaline earth sulfides, and the desired phosphor efficiency only results when an alkaline earth sulfide comprises the base pigment. Any alkaline earth compound is contemplated in my invention which will on reduction furnish the corresponding alkaline earth sulfide, e. g. calcium, strontium or barium compounds. As is well known in the pigment art, the most usual operation is the calcination of an alkaline earth sulfate in a reducing atmosphere such as hydrogen or ammonia. Such sulfate may also be reduced with carbon, but frequently carbon contamination may dirty the resulting pigment. Alternatively, an alkaline earth oxide or carbonate may be calcined in the presence of sulfur.

The special combination of bismuth with a silver compound is critical to achieve the activation of these alkaline earth sulfide bases. It is the incorporation of this second activator in the base material which results in the superior performance of these new phosphors. As is true in the preparation of other luminescent materials, it is generally unimportant in what form these activators are added to the base material. One usually refers to the activator simply as the metal or element, but it is in fact most often employed in the form of a compound. Essentially any oxide or any salt, either organic or inorganic, or any analogous metal compound may be utilized; the anion becomes unimportant because the calcination step eliminates it.

The choice of proportions of the two activators is quite delicate. I have found that bismuth produces its optimum effect on afterglow when it comprises between 200 and 300 P. P. M. (parts per million) by weight of the finished base material, and usually from 230 to 250 P. P. M. represent preferred quantities. Within such ranges, the secondary activator element, i. e. silver, may broadly comprise from .5 to 12 P. P. M. of the phosphor, and usually from 1 to 2 P. P. M. is sufficient. It is under such conditions that pigments having the longest and brightest afterglow are obtained.

The methods by which these activating substances are mixed with the alkaline earth base may be in general any known to the art. When the base is in the form of a sulfate, a particularly satisfactory procedure is to treat it with a solution of salts of the activators, such as the nitrates or acetates or citrates. Calcination in a reducing atmosphere functions both to form the alkaline earth sulfide and to eliminate the anions of the activating compounds. Alternatively, the alkaline earth sulfide may first be prepared and solid compounds of bismuth and silver ball-milled therewith before calcination. Too, a mixture of an alkaline earth oxide or carbonate and sulfur may be calcined with the activators to produce the alkaline earth sulfide. Many other methods are of course well known to workers in the field, and these are also contemplated in my process.

It is customary to add to the reaction materials a flux, which custom is preferably followed in my process. Such fluxes as sodium chloride, sodium sulfate, calcium fluoride, lithium fluoride and the like are generally satisfactory. The purpose of a flux appears to be to lower the calcination temperature necessary to effect activation of the sulfide pigment. Consequently, when a flux is used, calcination temperatures of from 800° to 1100° C. are satisfactory, while from 900° to 1000° C. are preferred.

The following examples are given simply in illustration of my invention and not in any way in limitation of its scope:

EXAMPLE I

Previously prepared and purified calcium sulfide was ball-milled with an aqueous solution of bismuth nitrate in a proportion to give 240 P. P. M. of bismuth by weight of the finished calcium sulfide. 1.2 P. P. M. of silver, added as a solution of silver nitrate, were incorporated therewith. 5% by weight of sodium sulfate was added as a flux, and the mixture calcined in silica equipment in an atmosphere of hydrogen. The temperature was 950° C., which was maintained for ½ hour. The product was allowed to cool while still in the hydrogen atmosphere. A loosely sintered and easily powdered white pigment resulted, which had a more intense and more lasting phosphorescence than did a calcium sulfide phosphor, similarly prepared but activated only with bismuth. After excitation by visible or near ultraviolet light, the color of the emission was a purplish blue.

EXAMPLE II

Purified strontium sulfate was mixed with 240 P. P. M. (by weight of the finished strontium sulfide) of bismuth in the form of bismuth nitrate solution. 1.2 P. P. M. of silver were added as a solution of silver nitrate. Sodium sulfate was again used as a flux and the mixed paste was dried and fired at 950° C. for 30 minutes in a hydrogen atmosphere. The white powdered product showed a clear and bright greenish-blue emission after excitation.

EXAMPLE III

Calcium sulfide was first prepared by usual commercial means from calcium carbonate and sulfur. This material was mixed with 260 P. P. M. (by weight of the sulfide) of bismuth, added as bismuth sulfate. One P. P. M. of silver was incorporated therewith, together with 3% of sodium sulfate as a flux. The mixture was ball-milled and calcined at 900° C. for 40 minutes. A white powder resulted, which exhibited improved phosphorescence like the products of Examples I and II.

EXAMPLE IV

Purified strontium sulfate and calcium sulfate were mixed in proportions to yield, after reduction, a pigment containing 25% by weight of strontium sulfide and 75% by weight of calcium sulfide. The sulfate mixture was ball-milled with aqueous solutions of bismuth nitrate, silver nitrate and sodium sulfate (flux) in quantities calculated to produce a finished sulfide pigment containing 240 P. P. M. bismuth, 1.2 P. P. M. silver, and 5% sodium sulfate. The mixture was dried and calcined in a silica boat in a hydrogen atmosphere at 950° C. for one-half hour. The product was similar to the ones already described.

My process as exemplified above is revealed as a simple and inexpensive way of producing a high grade phosphorescent pigment. The ingredients used are relatively common and the processing operation is adapted to economical commercial production. The activator ingredients may be added to the alkaline earth sulfate or sulfide prior to a non-oxidizing calcination treatment, as demonstrated in the examples. When using the alkaline earth sulfate as a starting material, it is necessary to operate under reducing conditions so as to convert the sulfate to the sulfide during the heat treatment in the presence of the activators, i. e., bismuth and silver. It is also possible to start with a product such as calcium oxide or calcium carbonate and calcine this in the presence of sulfur in order to obtain calcium sulfide. As explained above, the silver and bismuth may be added either before or after conversion of the calcium compound to the sulphide. These are optional methods of operation and various other changes are available to the operator, so long as the phosphorescent pigment is heat-treated after the addition of the bismuth and silver activators.

Various elements have been tried as substitutes for silver in my process and comparative data have been accumulated. These show the superiority of the bismuth-silver combination over combinations of bismuth with the elements cobalt, nickel or lead. These products were made in accordance with Example I by simply substituting 1.2 P. P. M. of cobalt, nickel or lead for the silver. The cooled calcium sulfide pigment products were tested for phosphorescence by exposing the pigment as a powder film to a 15 watt 360 BL lamp for 5 minutes. The products were then tested for brightness at the end of .5, 1, 2, 3, 4 and 5 minutes, along with a control in which only the primary activator bismuth was added. The results are given in Table I and show that silver as the secondary activator is superior to the other elements tried. The same series of pigments was tested for phosphorescence after excitation by a different type of light. The dry samples in this case were placed one foot from a 15 watt G. E. "Daylight" fluorescent lamp for 5 minutes. The data are to be found in Table II, and it will be noted that the product containing silver showed even greater superiority (especially pronounced immediately after excitation).

Table I

| Secondary activator | Time | | | | | |
|---|---|---|---|---|---|---|
| | 0.5 | 1 | 2 | 3 | 4 | 5 |
| none | 3.2 | 2.8 | 2.2 | 1.8 | 1.6 | 1.5 |
| Co | 8.6 | 6.8 | 4.4 | 3.0 | 2.1 | 1.7 |
| Ni | 10.2 | 8.0 | 5.4 | 3.9 | 3.0 | 2.5 |
| Pb | 13.5 | 9.0 | 5.8 | 4.0 | 3.1 | 2.5 |
| Ag | 18.0 | 12.5 | 8.0 | 5.6 | 4.1 | 3.2 |

Table II

| Secondary activator | Time | | | | | |
|---|---|---|---|---|---|---|
| | 0.5 | 1 | 2 | 3 | 4 | 5 |
| none | 4.0 | 2.5 | 1.7 | 1.3 | 1.0 | 0.9 |
| Co | 14.3 | 9.8 | 5.5 | 3.8 | 3.5 | 3.0 |
| Ni | 13.2 | 8.0 | 4.7 | 4.0 | 3.5 | 3.0 |
| Pb | 10.5 | 7.5 | 5.3 | 4.8 | 4.4 | 4.0 |
| Ag | 30.0 | 16.5 | 7.5 | 5.5 | 5.0 | 4.7 |

The figures are given in microlambert values. It is obvious that these data vary with the intensity, character and time of the excitation, but in any event, the figures should be in the same order when compared under identical conditions as has been done in this instance. It has also been found that the phosphorescent brightness will vary somewhat with the temperature of calcination and reaches a maximum within the preferred range of 900° to 1000° C. To a lesser extent, the time of calcination is a factor, as is true in the development of other pigment properties. Larger scale operations have been found to give improved results, probably because contamination by extraneous impurities is minimized, but data are not available on the products from large scale operations for the less effective secondary activators, namely, cobalt, nickel and lead. For this reason, the comparative data can only be presented for small scale operations as given in Tables I and II.

Calcium sulfide is a preferred pigment, but for many uses a mixture of calcium and strontium is of interest because of the phosphorescent properties obtained from combining the two sulfides. The amounts of the primary activator and of the secondary activator are somewhat critical and should generally never be greater than about 300 P. P. M. and 12 P. P. M., respectively, based on the weight of the alkaline earth sulfide. These small amounts may be referred to as "activator amounts."

While we generally refer to the activators as being bismuth and silver, it is understood that they are usually added in the form of their compounds, especially their water-soluble salts, such as their nitrates, chlorates, acetates, etc. In addition, bismuth chloride and sulfate can also be utilized. They are added prior to a calcination or muffling treatment at elevated temperatures and are preferably intimately associated with and dispersed throughout the pigment by milling the mixture before such calcination. This calcination treatment necessarily is carried out under a non-oxidizing or inert atmosphere, otherwise the sulfide will convert to the sulfate or oxide, and is conducted over a period of from about thirty minutes to one hour, or until effective diffusion of the activators throughout the pigment occurs.

I claim as my invention:

1. A process for the production of a phosphorescent pigment which comprises heating under non-oxidizing conditions at a temperature of from about 800° C. to 1100° C., a composition comprising calcium sulphide in admixture with sodium sulfate and quantities of bismuth nitrate and silver nitrate as activators, calculated to produce a finished sulfide pigment containing from 200–300 P. P. M. of bismuth and from .5 to 12 P. P. M. of silver.

2. A process for the production of a phosphorescent pigment which comprises heating under non-oxidizing conditions at a temperature of from about 800° C. to 1100° C., a composition comprising strontium sulphide in admixture with sodium sulfate and quantities of bismuth nitrate and silver nitrate as activators, calculated to produce a finished sulfide pigment containing from 200–300 P. P. M. of bismuth and from .5 to 12 P. P. M. of silver.

3. A process for the production of a phosphorescent pigment which comprises heating under non-oxidizing conditions at a temperature of from about 800° C. to 1100° C., a composition comprising a mixture of calcium and strontium sulphide in admixture with sodium sulfate and quantities of bismuth nitrate and silver nitrate as activators, calculated to produce a finished sulfide pigment containing from 200–300 P. P. M. of bismuth and from .5 to 12 P. P. M. of silver.

4. A phosphorescent pigment consisting essentially of an alkaline earth metal sulfide activated by 200–300 P. P. M. of bismuth and 0.5 to 12 P. P. M. of silver.

5. A phosphorescent pigment consisting essentially of an alkaline earth metal sulfide activated by 230–250 P. P. M. of bismuth and 1–2 P. P. M. of silver.

6. A phosphorescent pigment consisting essentially of calcium sulfide activated by 200–300 P. P. M. of bismuth and 0.5–12 P. P. M. of silver.

7. A phosphorescent pigment consisting essentially of strontium sulfide activated by 230–250 P. P. M. of bismuth and 1–2 P. P. M. of silver.

8. A phosphorescent pigment consisting essentially of a mixture of calcium sulfide and strontium sulfide activated by 200–300 P. P. M. of bismuth and 0.5–12 P. P. M. of silver.

9. A process for the production of a phosphorescent pigment which comprises heating under non-oxidizing conditions for a period of from about 30 minutes to 1 hour and at temperatures ranging from about 900–1000° C. a composition comprising an alkaline earth sulfide in admixture with a water-soluble alkali metal salt fluxing agent and quantities of a compound of bismuth and a compound of silver as activators calculated to produce a finished sulfide pigment containing from 230–250 P. P. M. of bismuth and from 1–2 P. P. M. of silver.

10. A process for the production of a phosphorescent pigment which comprises heating under non-oxidizing conditions, at a temperature of from about 800° C. to 1100° C., a composition having as essential ingredients an alkaline earth sulfide, a water-soluble alkali metal salt fluxing agent, and quantities of a compound of bismuth and a compound of silver, as activators, calculated to produce a finished sulfide pigment containing from 200–300 P. P. M. of bismuth and 0.5–12 P. P. M. of silver.

11. A process for the production of a phosphorescent pigment which comprises heating under non-oxidizing conditions, at a temperature of from about 800° C.–1100° C., a composition comprising an alkaline earth sulfide in admixture with a water-soluble alkali metal salt fluxing agent and quantities of a compound of bismuth and a compound of silver as activators, calculated to produce a finished sulfide pigment containing from 200–300 P. P. M. of bismuth and from .5–12 P. P. M. of silver.

12. A process for the production of a phosphorescent alkaline earth sulfide pigment which comprises heating under non-oxidizing conditions and at temperatures within the range of 800° C.–1100° C., a composition comprising an alkaline earth oxidic compound, sulfur, a water-soluble alkali metal salt fluxing agent, and quantities of a compound of bismuth and a compound of silver as activators calculated to produce a finished sulfide pigment containing from 200–300 P. P. M. of bismuth and from .5–12 P. P. M. of silver.

13. A process for the preparation of a phosphorescent pigment which comprises subjecting an alkaline earth sulfate to treatment at a temperature of from about 800° C.–1100° C. under reducing conditions for a period of from about 30 minutes to one hour, the alkaline earth sulfate containing a water-soluble alkali metal salt fluxing agent and quantities of a compound of bismuth and a compound of silver as activators calculated to produce a finished sulfide pigment containing from about 200–300 P. P. M. of bismuth and from .5–12 P. P. M. of a compound of silver.

DONALD W. LYON.

REFERENCES CITED

The following references are of record in the file of this patent:

UNITED STATES PATENTS

| Number | Name | Date |
|---|---|---|
| 2,049,765 | Fischer | Aug. 4, 1936 |
| 2,458,286 | Miller | Jan. 4, 1949 |
| 2,475,437 | Stern | July 5, 1949 |